(12) United States Patent
Oberoi et al.

(10) Patent No.: US 11,151,078 B2
(45) Date of Patent: Oct. 19, 2021

(54) STRUCTURED DATA ARCHIVAL WITH REDUCED DOWNTIME

(71) Applicant: ENTIT SOFTWARE LLC, Sanford, NC (US)

(72) Inventors: Danny Oberoi, Bangalore (IN); Jaspreet Singh, Bangalore (IN); Ibha Gandhi, Bangalore (IN)

(73) Assignee: Micro Focus LLC, Santa Clara, CA (US)

( * ) Notice: Subject to any disclaimer, the term of this patent is extended or adjusted under 35 U.S.C. 154(b) by 507 days.

(21) Appl. No.: 16/078,277

(22) PCT Filed: Apr. 8, 2016

(86) PCT No.: PCT/US2016/026790
§ 371 (c)(1),
(2) Date: Aug. 21, 2018

(87) PCT Pub. No.: WO2017/146750
PCT Pub. Date: Aug. 31, 2017

(65) Prior Publication Data
US 2019/0057099 A1 Feb. 21, 2019

(30) Foreign Application Priority Data
Feb. 24, 2016 (IN) .............................. 201641006473

(51) Int. Cl.
*G06F 16/11* (2019.01)
*G06F 11/14* (2006.01)
*G06F 7/14* (2006.01)

(52) U.S. Cl.
CPC .............. *G06F 16/113* (2019.01); *G06F 7/14* (2013.01); *G06F 11/1466* (2013.01)

(58) Field of Classification Search
USPC ........................................................ 707/667
See application file for complete search history.

(56) References Cited

U.S. PATENT DOCUMENTS 7,363,549 B2   4/2008  Sim-Tang
2004/0210608 A1  10/2004  Lee et al.
(Continued)

FOREIGN PATENT DOCUMENTS

WO   WO2015183316 A1   12/2015

OTHER PUBLICATIONS https://ieeexplore.ieee.org/stamp/stamp.jsp?tp=&arnumber=6557304 Author: Gtindebahar, M. et al. Date: May 9-11, 2013 Title: Zero Downtime Archiving Model for Financial Applications (Year: 2013).*

(Continued)

*Primary Examiner* — Muluemebet Gurmu

(57) ABSTRACT

Structured data archival with reduced downtime is disclosed. One example is a system including a deployer that manages an active table (AT), and a non-active table (NAT), and creates an intermediate table (IT) to record, during data archival, changes to the data to be archived. The deployer creates triggers on the AT and the NAT to facilitate the record, by the IT, of the changes to the data to be archived. An archiver initiates the data archival by archiving the copy of the data to be archived from the NAT, merges the recorded data from the IT to the NAT upon receiving an indication that the client access to the AT is not enabled, and switches the client access from the AT to the NAT by changing a table synonym, where the client access to the NAT is enabled upon completion of the data archival.

20 Claims, 7 Drawing Sheets

(56) References Cited

U.S. PATENT DOCUMENTS

| | | | |
|---|---|---|---|
| 2006/0080521 | A1 | 4/2006 | Barr et al. |
| 2007/0033252 | A1 | 2/2007 | Combest |
| 2007/0112892 | A1 | 5/2007 | Langley |
| 2008/0263007 | A1* | 10/2008 | Schmidt ............... G06F 16/2393 |
| 2008/0294697 | A1* | 11/2008 | Andrasak ............... G06F 16/219 |
| 2009/0157775 | A1* | 6/2009 | Pederson ............... G06F 16/219 |
| 2015/0074037 | A1 | 3/2015 | Sarferaz |
| 2020/0210447 | A1* | 7/2020 | Kumarasamy ........ G06F 16/219 |

OTHER PUBLICATIONS https://searchsap.techtarget.com/How-to-minimize-upgrade-downtime-during-SAP-ERP-60-upgrade-projects. Author: N/A Date: Apr. 15, 2009 Title: How to minimize upgrade downtime during SAP ERP 6.0 upgrade projects. (Year: 2009).* http://www.dell.com/downloads/global/power/ps.sq07-20070344-YU-OE Author: Yu, K. Date: Aug. 2007 Title: Minimizing Downtime During Large Database Migrations with Oracle Data Guard (Year: 2007).*

International Searching Authority, "Notification Of Transmittal Of The International Search Report And The Written Opinion", PCT/US2016/026790, dated Nov. 24, 2016 10 pages.

\* cited by examiner

STRUCTURED DATA ARCHIVAL WITH REDUCED DOWNTIME

BACKGROUND

Many businesses provide online access to client databases. Such access is generally available around the dock. These databases are often large, and may be frequently updated. Data in the databases may be archived. System downtime may be necessary for data archival, making the client data inaccessible to the client.

DETAILED DESCRIPTION

Figure 1:
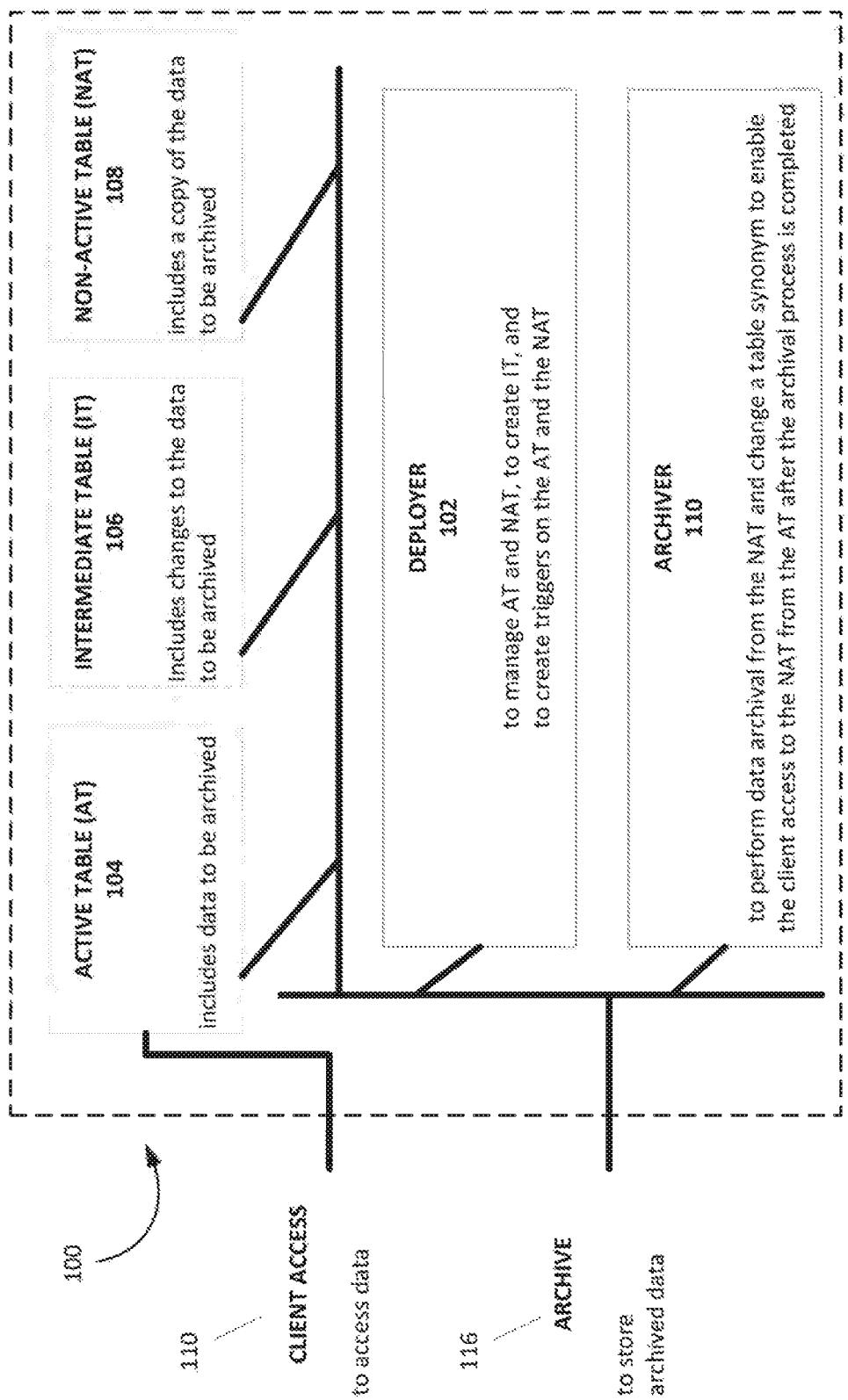
FIG. 1 is a functional block diagram illustrating one example of a system for structured data archival with reduced downtime.

Many large and medium scale businesses are dependent on large business databases that are continuously available to clients. For example, banking sites, e-commerce sites, online trading sites, and so forth, are accessible to clients at all times. These databases generally grow at a rapid rate, and data archiving is generally utilized to meet such data growth.

Structured data archival enables businesses to retire outdated applications through an automated process of extracting, validating, and deleting data. Archiving results in significantly reduced capital expenses and associated administrative costs, improved productivity for users of business applications, efficient Information Technology ("IT") staffing solutions, reduced response times to legal and/or compliance queries, and maximized value extraction for data. Once archiving is complete, a reduced size for the production database enables ease of maintenance.

Data archival is generally more challenging than performing data backups. For example, the time taken to delete archived data may involve a considerable time investment. In such instances, database resources are locked until deletion of archived data is completed, and such downtime may be in hours or days. Downtime may cause a business to incur significant losses, as all services are put on hold when the systems are down. At the same time, archiving is necessary to maintain business efficiency, and may be necessary to maintain data for legal compliance purposes, system performance, and data growth. As a result, for business databases that need to be continually available, as for example, databases for Airlines, insurance companies, retail, banking applications, and so forth, data archival becomes a necessity on one hand, and a considerable challenge on the other.

As described herein, predictive archiving of a structured dataset may be performed with reduced downtime. The term "archive", as used herein, generally refers to permanent or long-term preservation of contents of a dataset is a suitable database, generally referred to as an archive. The term "reduced downtime" generally refers to a reduction of an amount of time required for a downtime so that the dataset may be archived. The term "predictive" refers to a real-time selection of portions of the structured dataset that are to be archived, where the selections are instrumental in minimizing the downtime. As described herein, this predictive archiving may be facilitated by the use of triggers. The term "trigger" generally refers to a specialized stored procedure for a database that may be designed to automatically execute in response to a condition being satisfied in the database server. For example, DML triggers execute when a user tries to modify data through a data manipulation language (DML) event. DML events are INSERT, UPDATE, or DELETE statements associated with portions of data on a table or a view in a database. A predictive archive deployer creates triggers on active and non-active managed tables. A predictive archive runtime selector switches between active and non-active managed tables which brings a down time from hours to minutes.

As described in various examples herein, structured data archival with reduced downtime is disclosed. One example is a system including a deployer that manages an active table (AT), and a non-active table (NAT), and creates an intermediate table (IT) to record, during data archival, changes to the data to be archived. The deployer creates triggers on the AT and the NAT to facilitate the record, by the IT, of the changes to the data to be archived. An archiver initiates the data archival by archiving the copy of the data to be archived from the NAT, merges the recorded data from the IT to the NAT upon receiving an indication that the client access to the AT is not enabled, and switches the client access from the AT to the NAT by changing a table synonym, where the client access to the NAT is enabled upon completion of the data archival.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a functional block diagram illustrating one example of a system for structured data archival with reduced downtime. System 100 includes a deployer 102, and an archiver 110. The deployer 102 is to manage an active table (AT) 104, and a non-active table (NAT) 108, where client access to the AT 104 is enabled, and where the AT 104 includes data to be archived, and where the client access to the NAT 108 is not enabled, and where the NAT 108 includes a copy of the data to be archived. The term "table" generally refers to any database object utilized to store data. In some examples, the table may be utilized to store data in a structured database. In some examples, the table may have a primary/unique (e.g., not null) key.

Generally, the AT 104 may be available for client access 110. For example, AT 104 may be a table supporting a client portal available to a customer in an online banking system. As another example, AT 104 may be a table supporting an interactive trading platform available to a customer in an online trading platform. The AT 104 may be modified in real-time based on client interactions. The AT 104 may be in a schema that is specific to client access 110. Such schema may depend on the type of client access 110 (e.g., banking platform, trading platform, online shopping platform, etc.), and may depend on modifications made by a client. For example, different business may provide different client interfaces, and the schema for the ATs 104 may be tailored to such different business needs.

A purpose of the archival process is to archive 116 data contents of the AT 104 so that the data contents are available for client access 110 with reduced downtime. As described herein, this may be achieved by copying contents of the AT 104 into the NAT 108, archiving data from the NAT 108, recording the changes to the AT 104 in an intermediate table (IT) 106, initiating a reduced downtime when client access 110 to the AT 104 is suspended, merging contents of the IT 106 into NAT 108, swapping links between the AT 104 and NAT 108, so that NAT 108 is now available for client access 110.

The NAT 108 is a copy of the contents of the AT 104. The NAT 108 is generally not available for client access 110. The NAT 108 may be created in a schema that is based on the schema for the AT 104. In some examples, the schema for the NAT 108 may be identical to the schema for the AT 104. In some examples, the schema for the NAT 108 may be different from the schema for AT 104. For example, the schema for the NAT 108 may be designed to fit storage parameters for archival. In some examples, the schema for the NAT 108 may be designed to comply with archival rules and/or policies.

The deployer 102 is to create an intermediate table (IT) 106 to record, during data archival, changes to the data to be archived. As described herein, the AT 104 is available for client access 110. A copy of the AT 104 is made onto the NAT 106. However, changes to the data contents of the AT 104 may occur during and/or subsequent to copying of the data contents from the AT 104 to the NAT 108. For example, AT 104 may be a table supporting a client portal available to a customer in an online banking system. The contents of AT 104 may be copied onto NAT 108 at a first time. Subsequently, the customer may log into the client portal and make changes to the online banking account (e.g., transfer funds between accounts, withdraw funds, etc.). Such activity is not saved in the NAT 108. However, the IT 106 records such intermediate changes to the AT 104 that are not copied onto the NAT 108.

In some examples, the deployer 102 is to create a new schema for the NAT 108, and create the IT 106 based on one of the new schema for the NAT 108 and an existing schema for the AT 104. As described herein, the deployer 102 may create a new schema for the NAT 108 based on a number of factors (e.g., schema for the AT 104, client type, client access type, archival parameters, archive rules, archive policies, and so forth). Accordingly, the deployer 102 may create the IT 106 based on the existing schema for the AT 104 or based on the new schema for the NAT 108.

The deployer 102 creates triggers on the AT 104 and the NAT 108 to facilitate the record, by the IT 106, of the changes to the data to be archived. As described herein, data in the AT 104 may change subsequent to copying its contents onto the NAT 108. The IT 106 records such changes based on the triggers that are created by the deployer 102. In some examples, the triggers may include one of insert, update, and delete triggers. For example, in the context of an online banking system, the AT 104 may be a table supporting a customer's banking account. Subsequent to copying data contents from the AT 104 to the NAT 108, a new deposit may be made into the customer's account. Accordingly, the deployer 102 may create an insert trigger on the AT 104 to indicate to the IT 106 that this new transaction is to be inserted into NAT 108. As another example, subsequent to copying data contents from the AT 104 to the NAT 108, the new deposit will alter the total available balance in the customer account. Accordingly, the deployer 102 may create an update trigger on the AT 104 to indicate to the IT 106 that the balance amount is to be updated in the NAT 108. Also, for example, subsequent to copying data contents from the AT 104 to the NAT 108, the new deposit may facilitate removal of a "hold" status in the customer account. Accordingly, the deployer 102 may create a delete trigger on the AT 104 to indicate to the IT 106 that the "hold" is to be deleted in the NAT 108. Although the deployer 102 creates the triggers in the AT 104 and NAT 108, these triggers are generally disabled until archival begins. In some examples, the deployer 102 is to record information associated with the AT 104 and the NAT 108 in a metadata table.

System 100 includes an archiver 110 to initiate the data archival by archiving the copy of the data to be archived from the NAT 108. Accordingly, contents of the AT 104 continue to be available for client access 110, whereas a copy of the contents are archived from the copy in the NAT 108. The archiver 110 determines if a system downtime is available. The term "downtime" as used herein generally refers to a period of time when the client access 110 is disabled. Downtime may result in huge losses for a company, as services may be put on hold when systems are down. Generally, the archiver 110 may identify the information associated with the AT 104 from the metadata table that was created by the deployer 102. The archiver 110 may enable triggers on the AT 104.

In some examples, the archiver 110 may select and copy the entire data from the AT 104 to the NAT 108. In some examples, such a selection may be based on the information from the metadata table. The archiver 110 may start archiving on the NAT 108 based on rules and policy, including, for example, the select, copy and/or delete triggers. For example, based on rules and archiving policies, the archiver 110 may archive a selected portion of data from the NAT 108.

In some examples, the archiver 110 may pause and wait for an indication that the client access to the AT 104 is not enabled, i.e., an indication that a downtime has been initiated. The archiver 110 may merge the recorded data from the IT 106 to the NAT 108 upon receiving the indication that the client access to the AT 104 is not enabled. The archiver 110 merges the changes to the data to be archived from the IT 106 to the NAT 108, based on the triggers.

The archiver 110 switches the client access 110 from the AT 104 to the NAT 108 by changing a table synonym, where the client access to the NAT 108 is enabled upon completion of the data archival. In some examples, the table synonym is an alternate name for the NAT 108. When the table synonym is changed, the client access 110 is switched from the AT 104 to the NAT 108, where the NAT 108 is a new active table. This may be achieved, for example, by pointing a managed table synonym to the new active table which is the previous NAT 108. Changing the table synonym minimizes the amount of time for swapping access links from the AT 104 to the NAT 108. The archiver 110 then updates the metadata with the information about the new active table. In some examples, the archiver 110 is to provide, upon completion of the data archival, a second indication that the client access 110 to the new active table, NAT 108, is enabled. In some examples, this signals termination of the downtime, enabling the system to be operational for client access 110, thereby making the new active table, old NAT 108, available for client access 110.

Generally, after validating that data is successfully archived, the new NAT 108 and the IT 106 may be truncated. In some examples, such truncation may be performed manually, or via a separate cleanup operation. A bidirectional handshake protocol may be utilized to confirm truncation of data. Although additional storage space may be utilized during runtime, such storage space may be reclaimed after completion of the data archival. In some examples, a storage capacity load on a main system may increase while archival operations are being performed; however, another downtime may generally not be required to perform administrative activities like rebuilding of indexes and tables.

System 100 may be implemented by a computing device. As used herein, a computing device may be a desktop computer, laptop (or notebook) computer, workstation, tablet computer, mobile phone, smart device, switch, router, server, blade enclosure, or any other processing device or equipment including a processing resource. In examples described herein, a processing resource may include, for example, one processor or multiple processors included in a single computing device or distributed across multiple computing devices. The components of system 100 (e.g., 102, 104) may be any combination of hardware and programming to implement the functionalities described herein. In examples described herein, such combinations of hardware and programming may be implemented in a number of different ways. For example, the programming for the components may be processor executable instructions stored on at least one non-transitory machine-readable storage medium and the hardware for the components may include at least one processing resource to execute those instructions. In some examples, the hardware may also include other electronic circuitry to at least partially implement at least one component of system 100. In some examples, the at least one machine-readable storage medium may store instructions that, when executed by the at least one processing resource, at least partially implement some or all of components 102, and 104 of system 100. In such examples, system 100 may include the at least one machine-readable storage medium storing the instructions and the at least one processing resource to execute the instructions. In other examples, the functionalities of any components of system 100 may be at least partially implemented in the form of electronic circuitry.

For example, the deployer 102 may be a combination of hardware and programming (e.g., processor executable instructions). For example, the programming of deployer 102 may include instructions executable to create an intermediate table to record, during data archival, changes to the data to be archived. Also, for example, the programming of deployer 102 may include instructions executable to create triggers on the AT and the NAT to facilitate the record, by the IT, of the changes to the data to be archived. As another example, the deployer 102 may include hardware to physically store, for example, the triggers for the active tables, intermediate tables, and non-active tables. Also, for example, the deployer 102 may include a combination of hardware and software programming to dynamically interact with the other components of system 100.

Likewise, the archiver 110 may be a combination of hardware and programming (e.g., processor executable instructions) to initiate data archival by archiving the copy of the data to be archived from the NAT. For example, the programming of archiver 110 may include instructions executable to merge the recorded data from the IT to the NAT upon receiving an indication that the client access to the AT is not enabled. Also, for example, archiver 110 may include hardware to physically store, for example, instructions to switch the client access from the AT to the NAT by changing a table synonym, where the client access to the NAT is enabled upon completion of the data archival. The archiver 110 may include a combination of hardware and software programming to dynamically interact with the other components of system 100.

Generally, as described herein, the components of system 100 may include software programming and physical networks to be communicatively linked to other components of system 100. In some instances, the components of system 100 may include a processor and a memory, while programming code is stored and on that memory and executable by a processor to perform designated functions.

A computing device, as used herein, may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform a unified visualization interface. The computing device may include a processor and a computer-readable storage medium.

Figure 2:
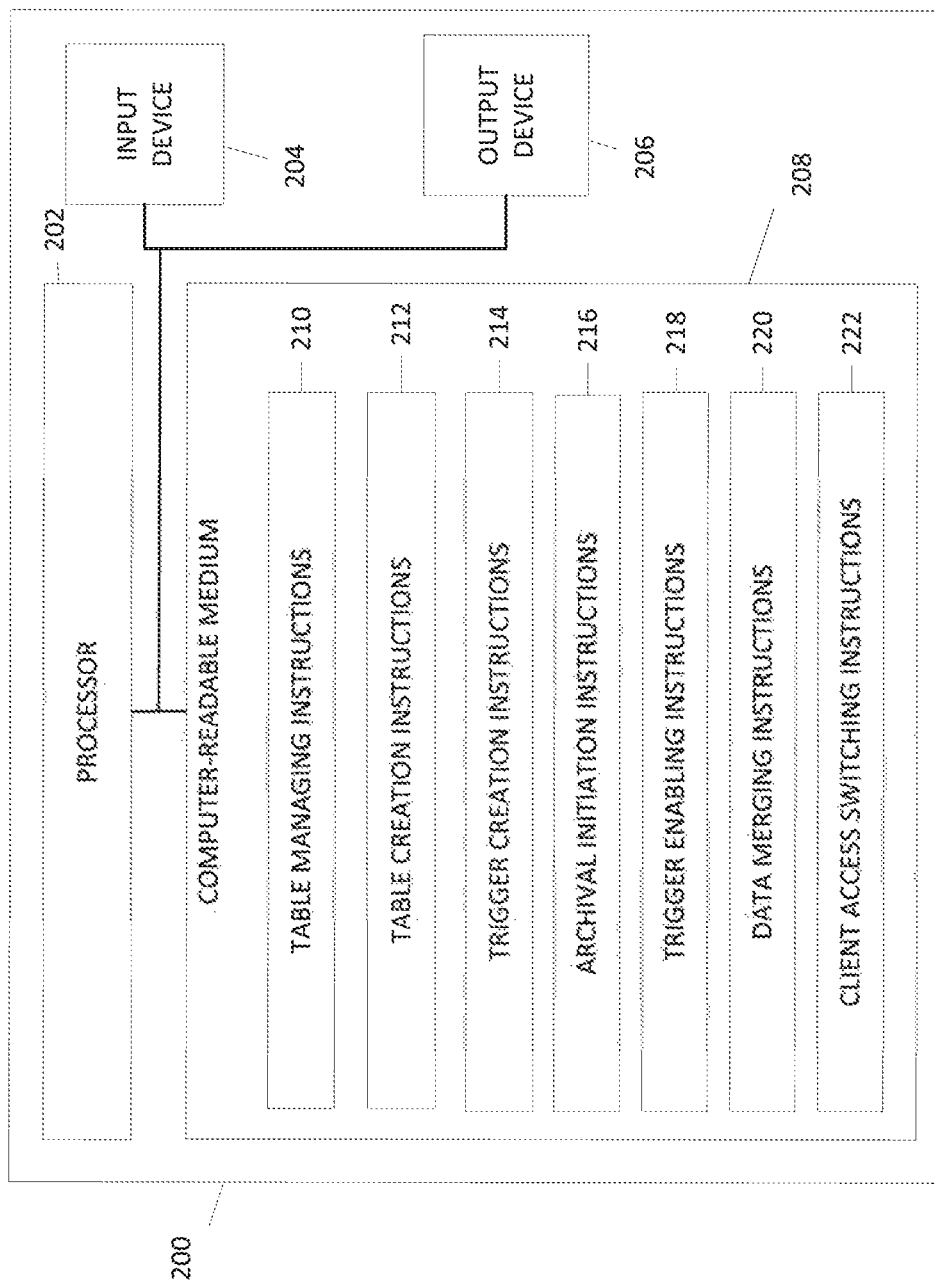
FIG. 2 is a block diagram illustrating one example of a computer readable medium for structured data archival with reduced downtime.

FIG. 2 is a block diagram illustrating one example of a computer readable medium for structured data archival with reduced downtime. Processing system 200 includes a processor 202, a computer readable medium 208, input device 204, and output device 206. Processor 202, computer readable medium 208, input device 204, and output device 206 are coupled to each other through a communication link (e.g., a bus).

Processor 202 executes instructions included in the computer readable medium 208. Computer readable medium 208 includes table managing instructions 210 to manage an active table (AT), and a non-active table (NAT), wherein client access to the AT is enabled, and wherein the AT includes data to be archived, and wherein the client access to the NAT is not enabled, and wherein the NAT includes a copy of the data to be archived.

Computer readable medium 208 includes table creation instructions 212 to create an intermediate table (IT) to record, during data archival, changes to the data to be archived.

Computer readable medium 208 includes trigger creation instructions 214 to create triggers on the AT and the NAT to facilitate the record, by the IT, of the changes to the data to be archived.

Computer readable medium 208 includes archival initiation instructions 216 to initiate the data archival by archiving the copy of the data to be archived from the NAT.

Computer readable medium 208 includes trigger enabling instructions 218 to enable the triggers on the AT based on information associated with the AT, wherein the information is retrieved from a metadata table.

Computer readable medium 208 includes data merging instructions 220 to merge the recorded data from the IT to the NAT upon receiving an indication that the client access to the AT is not enabled.

Computer readable medium 208 includes client access switching instructions 222 to switch the client access from the AT to the NAT by changing a table synonym, where the client access to the NAT is enabled upon completion of the data archival.

In some examples, computer readable medium 208 includes instructions to provide a second indication that the client access to the NAT is enabled.

In some examples, computer readable medium 208 includes instructions to create a new schema for the NAT, and to create the IT based on one of the new schema for the NAT and an existing schema for the AT.

Input device 204 includes a keyboard, mouse, data ports, and/or other suitable devices for inputting information into processing system 200. In some examples, input device 204 is used to receive, via a computing device, a first indication to initiate data archival. Output device 206 includes a monitor, speakers, data ports, and/or other suitable devices for outputting information from processing system 200. In some examples, output device 206 is used to provide, via a computing device, a second indication that the client access to the NAT is enabled.

As used herein, a computer readable medium may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium 208 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

As described herein, various components of the processing system 200 are identified and refer to a combination of hardware and programming configured to perform a designated visualization function. As illustrated in FIG. 2, the programming may be processor executable instructions stored on tangible computer readable medium 208, and the hardware may include processor 202 for executing those instructions. Thus, computer readable medium 208 may store program instructions that, when executed by processor 202, implement the various components of the processing system 200.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 208 may be any of a number of memory components capable of storing instructions that can be executed by Processor 202. Computer readable medium 208 may be non-transitory in the sense that it does not encompass a transitory signal but instead is made up of one or more memory components configured to store the relevant instructions. Computer readable medium 208 may be implemented in a single device or distributed across devices. Likewise, processor 202 represents any number of processors capable of executing instructions stored by computer readable medium 208. Processor 202 may be integrated in a single device or distributed across devices. Further, computer readable medium 208 may be fully or partially integrated in the same device as processor 202 (as illustrated), or it may be separate but accessible to that device and processor 202. In some examples, computer readable medium 208 may be a machine-readable storage medium.

Figure 3:
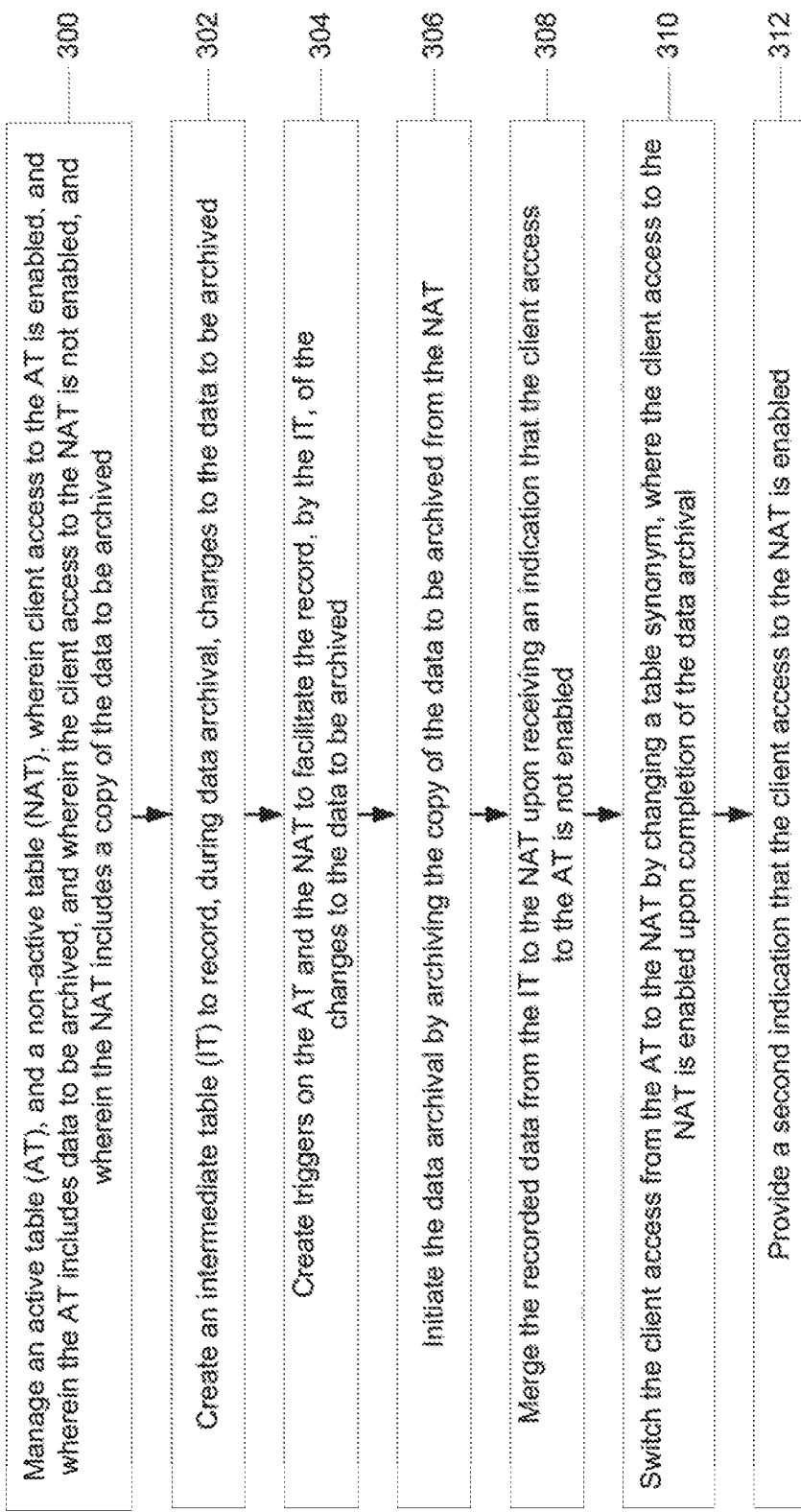
FIG. 3 is a flow diagram illustrating one example of a method for structured data archival with reduced downtime.

FIG. 3 is a flow diagram illustrating one example of a method for structured data archival with reduced downtime. In some examples, such an example method may be implemented by a system such as, for example, system 100 of FIG. 1. In some examples, such an example method may be implemented in the form of executable instructions stored on a machine-readable storage medium, such as storage medium 208, and/or in the form of electronic circuitry.

At 300, an active table (AT) and a non-active table (NAT) are managed, where client access to the AT is enabled, and where the AT includes data to be archived, and where the client access to the NAT is not enabled, and where the NAT includes a copy of the data to be archived.

At 302, an intermediate table (IT) is created to record, during data archival, changes to the data to be archived.

At 304, triggers are created on the AT and the NAT to facilitate the record, by the IT, of the changes to the data to be archived.

At 306, the data archival is initiated by archiving the copy of the data to be archived from the NAT.

At 308, the recorded data from the IT is merged to the NAT upon receiving an indication that the client access to the AT is not enabled.

At 310, the client access is switched from the AT to the NAT by changing a table synonym, where the client access to the NAT is enabled upon completion of the data archival.

At 312, a second indication is provided that the client access to the NAT is enabled.

Figure 4:
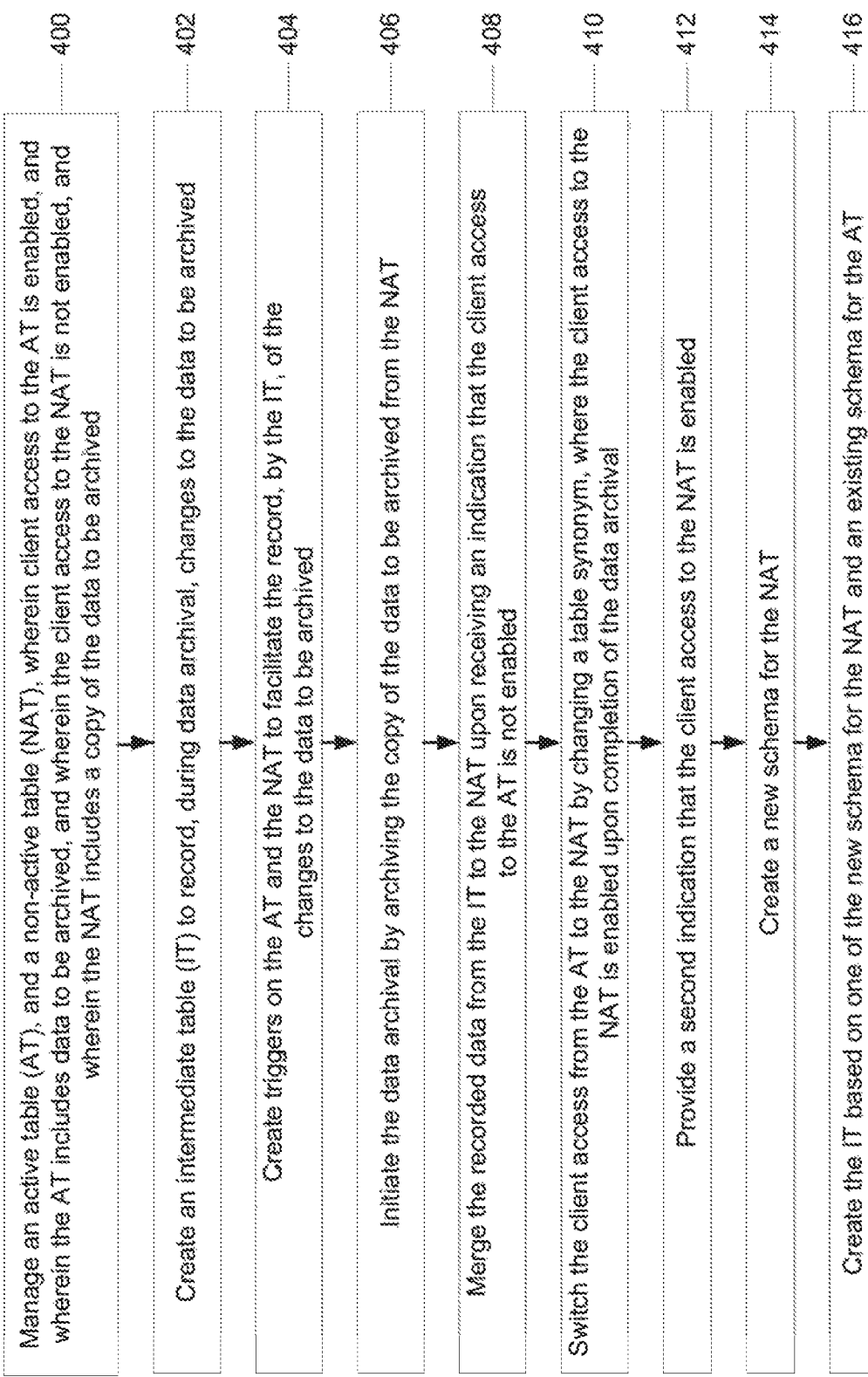
FIG. 4 is a flow diagram illustrating one example of a method for creating an intermediate table for structured data archival with reduced downtime.

FIG. 4 is a flow diagram illustrating one example of a method for creating an intermediate table for structured data archival with reduced downtime. In some examples, such an example method may be implemented by a system such as, for example, system 100 of FIG. 1. In some examples, such an example method may be implemented in the form of executable instructions stored on a machine-readable storage medium, such as storage medium 208, and/or in the form of electronic circuitry.

At 400, an active table (AT) and a non-active table (NAT) are managed, where client access to the AT is enabled, and where the AT includes data to be archived, and where the client access to the NAT is not enabled, and where the NAT includes a copy of the data to be archived.

At 402, an intermediate table (IT) is created to record, during data archival, changes to the data to be archived.

At 404, triggers are created on the AT and the NAT to facilitate the record, by the IT, of the changes to the data to be archived.

At 406, the data archival is initiated by archiving the copy of the data to be archived from the NAT.

At 408, the recorded data from the IT is merged to the NAT upon receiving an indication that the client access to the AT is not enabled.

At 410, the client access is switched from the AT to the NAT by changing a table synonym, where the client access to the NAT is enabled upon completion of the data archival.

At 412, a second indication is provided that the client access to the NAT is enabled.

At 414, a new schema is created for the NAT.

At 416, the IT is created based on one of the new schema for the NAT and an existing schema for the AT.

Figure 5:
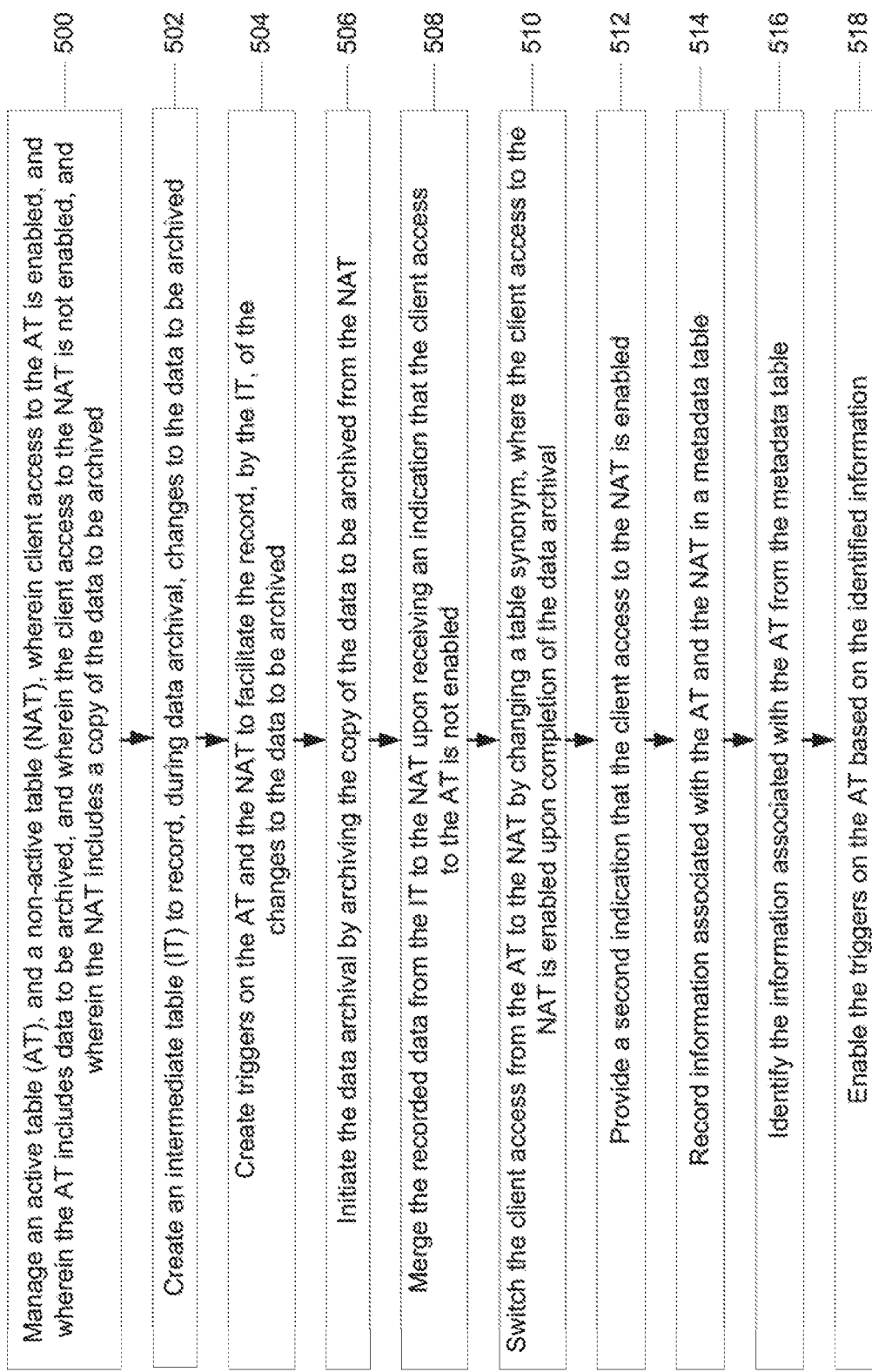
FIG. 5 is a flow diagram illustrating one example of a method for initiating data archival for structured data archival with reduced downtime.

FIG. 5 is a flow diagram illustrating one example of a method for initiating data archival for structured data archival with reduced downtime. In some examples, such an example method may be implemented by a system such as, for example, system 100 of FIG. 1. In some examples, such an example method may be implemented in the form of executable instructions stored on a machine-readable storage medium, such as storage medium 208, and/or in the form of electronic circuitry.

At 500, an active table (AT) and a non-active table (NAT) are managed, where client access to the AT is enabled, and where the AT includes data to be archived, and where the client access to the NAT is not enabled, and where the NAT includes a copy of the data to be archived.

At 502, an intermediate table (IT) is created to record, during data archival, changes to the data to be archived.

At 504, triggers are created on the AT and the NAT to facilitate the record, by the IT, of the changes to the data to be archived.

At 506, the data archival is initiated by archiving the copy of the data to be archived from the NAT.

At 508, the recorded data from the IT is merged to the NAT upon receiving an indication that the client access to the AT is not enabled.

At 510, the client access is switched from the AT to the NAT by changing a table synonym, where the client access to the NAT is enabled upon completion of the data archival.

At 512, a second indication is provided that the client access to the NAT is enabled.

At 514, information associated with the AT and the NAT is recorded in a metadata table.

At 516, the information associated with the AT is identified from the metadata table.

At 518, the triggers on the AT are enabled based on the identified information.

Figure 6:
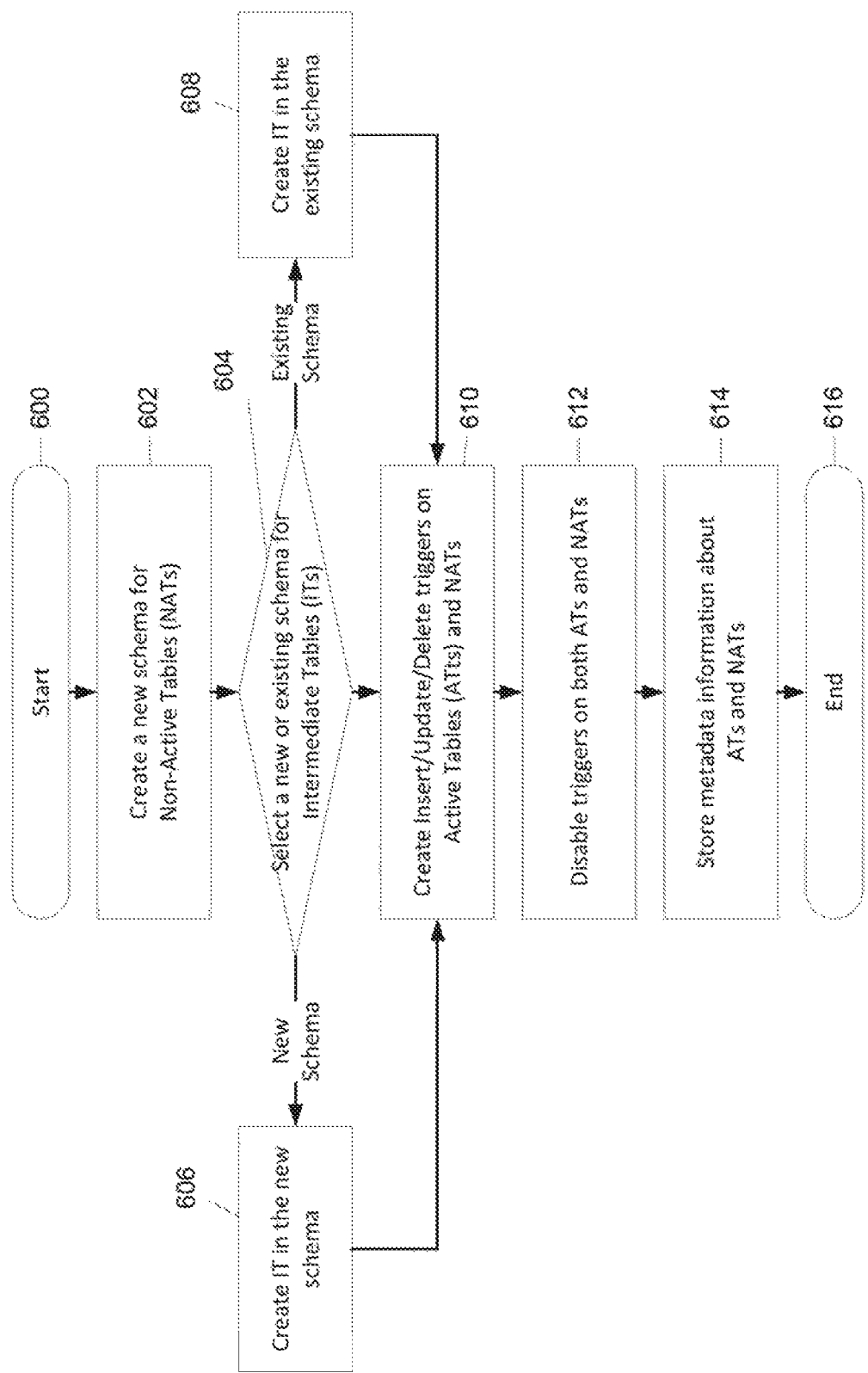
FIG. 6 is a flow diagram illustrating one example of a method for creating triggers on active and non-active tables.

FIG. 6 is a flow diagram illustrating one example of a method for creating triggers on active and non-active tables. In some examples, such an example method may be implemented by a system such as, for example, system 100 of FIG. 1. In some examples, such an example method may be implemented in the form of executable instructions stored on a machine-readable storage medium, such as storage medium 208, and/or in the form of electronic circuitry.

At 600, the example flow may be started.

At 602, a new schema may be created for a non-active table (NAT).

At 604, a new or existing schema may be selected for an intermediate table (IT).

At 606, the new schema for the IT may be selected based on the new schema for the NAT.

At 608, the new schema for the IT may be selected based on the existing schema for the active table (AT).

At 610, triggers may be created for the ATs and NATs, including insertion, update, and/or deletion of triggers so that new events, occurring during active archival, may be recorded on the IT.

At 612, triggers may be disabled on the ATs and the NATs. The triggers may be kept disabled until active data archival is initiated.

At 614, metadata information about the ATs and NATs may be stored, for example, in metadata tables.

At 616, the process flow may be terminated.

Figure 7:
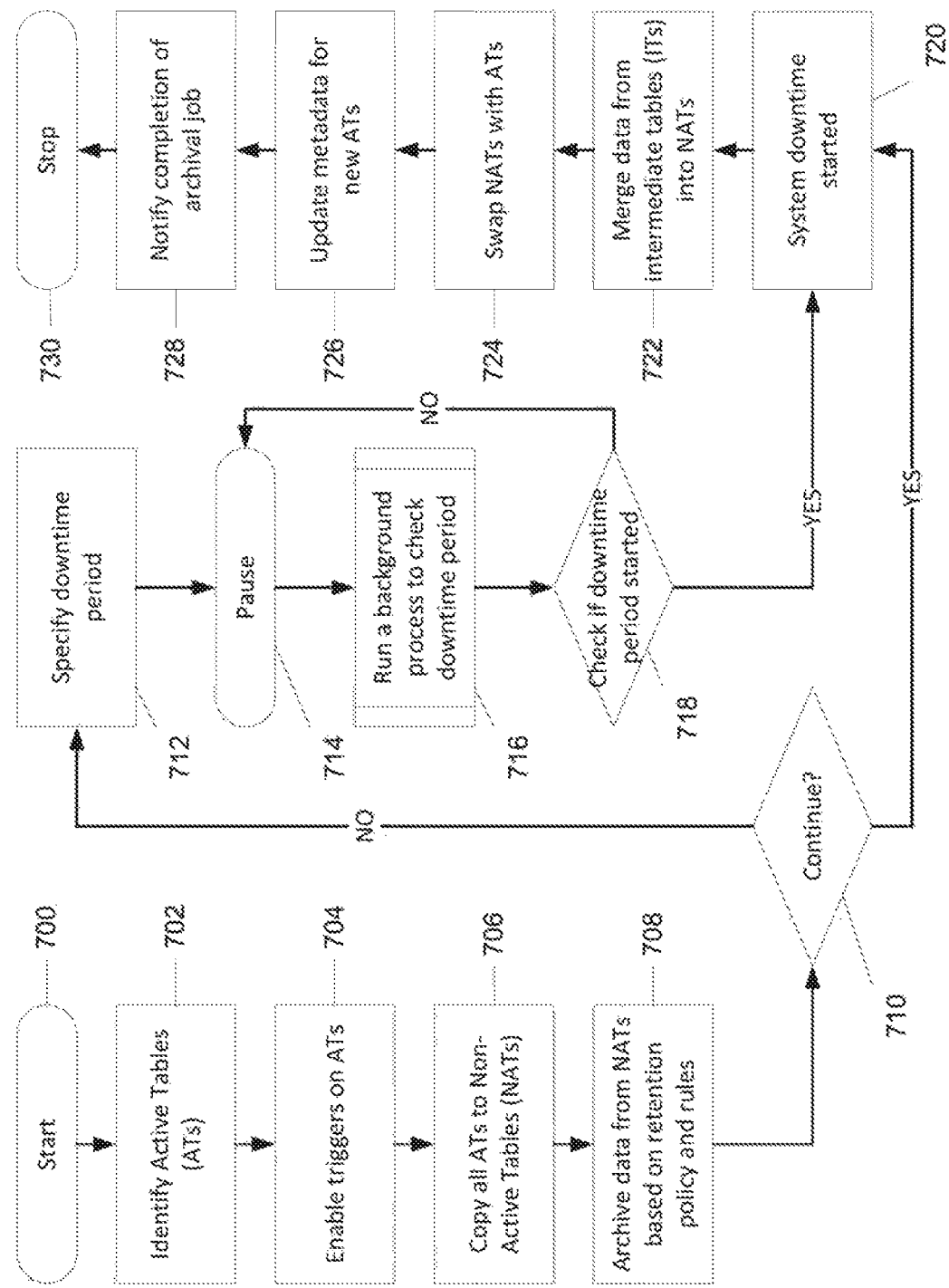
FIG. 7 is a flow diagram illustrating another example of a method for structured data archival with reduced downtime.

FIG. 7 is a flow diagram illustrating another example of a method for structured data archival with reduced downtime. In some examples, such an example method may be implemented by a system such as, for example, system 100 of FIG. 1. In some examples, such an example method may be implemented in the form of executable instructions stored on a machine-readable storage medium, such as storage medium 208, and/or in the form of electronic circuitry.

At 700, the process may be started.

At 702, active tables (ATs) may be identified.

At 704, triggers may be enabled on the ATs.

At 706, a copy of data on the ATs may be made onto the non-active tables (NATs).

At 708, data may be archived from the NATs based on retention rules and policies.

At 710, a determination may be made if the archival process is to continue.

At 712, upon a determination that the archival process is not to continue, a download time may be specified and/or scheduled.

At 714, the process may be paused to wait for an indication that the client access to the AT is not enabled, i.e., an indication that a downtime has been initiated.

At 716, a background process may be run to determine a state of the downtime period.

At 718, it is determined if the downtime period has started. Upon a determination that the downtime period has not started, the process returns to a pause state at 714.

At 718, upon a determination that the downtime period has started, the process moves to 720.

At 710, upon a determination that the archival process is to continue, the process moves to 720.

At 720, the system downtime is started.

At 722, data is merged from the ITs to the NATs.

At 724, NATs are swapped with ATs (e.g., by changing a table synonym for the NATs).

At 726, metadata is updated for the new ATs.

At 728, a notification indicative of archive completion is generated.

At 730, the process may be terminated.

Examples of the disclosure provide a generalized system for structured data archival with reduced downtime. The generalized system significantly reduces capital expenses and associated administrative costs, improves business application users' productivity and overall IT staff efficiency, enables responses to legal and compliance requests quickly and effectively, and allows data to be leveraged to its highest value. Upon completion of the data archival process as described herein, the production database becomes smaller in size and may be maintained more efficiently.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A system for structured data archival with reduced downtime comprising:
    a processor; and
    a memory to store instructions that, when executed by the processor, cause the processor to:
        manage an active table (AT); and a non-active table (NAT), wherein client access to the AT is enabled, wherein the AT includes data to be archived, and wherein the client access to the NAT is not enabled, and wherein the NAT includes a copy of the data to be archived;
create an intermediate table (IT) to record data, during data archival, of intermediate changes to the AT that are not copied onto the NAT to be archived;
create triggers on the AT and the NAT to facilitate recording of the data, by the IT, of the intermediate changes to the AT that are not copied onto the NAT to be archived;
initiate the data archival by archiving the copy of the data to be archived from the NAT;
merge the recorded data from the 1T to the NAT upon receiving an indication that the client access to the AT is not enabled; and
switch the client access from the AT to the NAT by changing a table synonym, wherein the client access to the NAT is enabled upon completion of the data archival.

2. The system of claim 1, wherein the instructions, when executed by the processor, cause the processor to provide a second indication that the client access to the NAT is enabled.

3. The system of claim 1, wherein the instructions, when executed by the processor, cause the processor to:
create a new schema for the NAT; and
create the IT based on one of the new schema for the NAT and an existing schema for the AT.

4. The system of claim 1, wherein the triggers include one of insert, update, and delete triggers.

5. The system of claim 1, wherein the instructions, when executed by the processor, cause the processor to initiate the data archival by enabling the triggers.

6. The system of claim 1, wherein the instructions, when executed by the processor, cause the processor to record information associated with the AT and the NAT in a metadata table.

7. The system of claim 6, wherein the instructions, when executed by the processor, cause the processors to identify the information associated with the AT from the metadata table.

8. A method for structured data archival with reduced downtime comprising:
managing an active table (AT) and a non-active table (NAT), wherein client access to the AT is enabled, wherein the AT includes data to be archived, and wherein the client access to the NAT is not enabled, and wherein the NAT includes a copy of the data to be archived;
creating an intermediate table (IT) to record data, during data archival, of intermediate changes to the AT that are not copied onto the NAT to be archived;
creating triggers on the AT and the NAT to facilitate recording of the data, by the IT, of the intermediate changes to the AT that are not copied onto the NAT to be archived;
initiating the data archival by archiving the copy of the data to be archived from the NAT;
merging the recorded data from the IT to the NAT upon receiving an indication that the client access to the NAT is not enabled;
switching the client access from the AT to the NAT by changing a table synonym, wherein the client access to the NAT is enabled upon completion of the data archival; and
providing a second indication that the client access to the NAT is enabled.

9. The method of claim 8, comprising:
creating a new schema for the NAT; and
creating the IT based on one of the new schema for the NAT and an existing schema for the AT.

10. The method of claim 8, comprising enabling the triggers upon the initiating of the data archival.

11. The method of claim 10, comprising:
recording information associated with the AT and the NAT in a metadata table;
identifying the information associated with the AT from the metadata table; and
enabling the triggers on the AT based on the identified information.

12. The method of claim 8, wherein the triggers include one of insert, update, and delete triggers.

13. A non-transitory computer readable medium for structured data archival with reduced downtime, comprising executable instructions to:
manage an active table (AT) and a non-active table (NAT), wherein client access to the AT is enabled, wherein the AT includes data to be archived, wherein the client access to the NAT is not enabled, and wherein the NAT includes a copy of the data to be archived;
create an intermediate table (IT) to record data, during data archival, of intermediate changes to the AT that are not copied onto the NAT to be archived;
create triggers on the AT and the NAT to facilitate recording of the data, by the IT, of the intermediate changes to the AT that are not copied onto the NAT to be archived;
initiate the data archival by archiving the copy of the data to be archived from the NAT;
enable the triggers on the AT based on information associated with the AT, wherein the information is retrieved from a metadata table;
merge the recorded data from the IT to the NAT upon receiving an indication that the client access to the AT is not enabled; and
switch the client access from the AT to the NAT by changing a table synonym, wherein the client access to the NAT is enabled upon completion of the data archival.

14. The non-transitory computer readable medium of claim 13, comprising instructions to provide a second indication that the client access to the NAT is enabled.

15. The non-transitory computer readable medium of claim 13, comprising instructions to:
create a new schema for the NAT; and
create the IT based on one of the new schema for the NAT and an existing schema for the AT.

16. The system of claim 1, wherein the table synonym is an alternate name for the NAT and the NAT is a new AT.

17. The system of claim 1, wherein changing the table synonym includes minimizing an amount of time for swapping an access link from the AT to the NAT.

18. The method of claim 8, wherein the table synonym is an alternate name for the NAT and the NAT is a new AT.

19. The method of claim 8, wherein changing the table synonym includes minimizing an amount of time for swapping an access link from the AT to the NAT.

20. The non-transitory computer readable medium of claim 13, wherein changing the table synonym includes minimizing an amount of time for swapping an access link from the AT to the NAT.

* * * * *